United States Patent [19]
Walters et al.

[11] Patent Number: 5,975,829
[45] Date of Patent: *Nov. 2, 1999

[54] TRAILER FOR ENDWISE TRANSPORT OF MOWER-CONDITIONER

[75] Inventors: James C. Walters, Ottumwa; Allan Wesley Rosenbalm, Blakesburg; Craig Allen Richardson, Ottumwa, all of Iowa

[73] Assignee: Deere & Company, Moline, Ill.

[ * ] Notice: Under 35 U.S.C. 154(b), the term of this patent shall be extended for 56 days.

[21] Appl. No.: 08/586,524

[22] Filed: Jan. 16, 1996

[51] Int. Cl.⁶ .................................................. B65G 67/02
[52] U.S. Cl. ............................................ 414/537; 14/71.1
[58] Field of Search ..................................... 414/537, 538; 14/71.1, 71.5

[56] References Cited

U.S. PATENT DOCUMENTS

| | | | |
|---|---|---|---|
| 2,516,881 | 8/1950 | Jarvis .................................. | 414/537 X |
| 2,720,325 | 10/1955 | Kay ....................................... | 414/537 |
| 3,937,344 | 2/1976 | Montgomery et al. ............. | 414/537 X |
| 4,032,167 | 6/1977 | Chereda .............................. | 414/537 X |
| 4,607,996 | 8/1986 | Koch ...................................... | 414/537 |
| 4,874,284 | 10/1989 | New, Jr. ................................... | 414/537 |

*Primary Examiner*—David A. Bucci

[57] ABSTRACT

A trailer, for a header-equipped implement, has a T-shaped main frame, with the head of the T being defined by a beam extending in the direction of travel and with the stem of the T centered between a pair of loading ramps having first end portions coupled to the beam for pivoting about a fulcrum such that the ramps are moved from a loading to a transport position by the weight of the implement when the implement is backed up the ramps to a loaded position resting on the beam and in engagement with respective bumper/latch bars fixed to the beam. Stability of the trailer is maintained during loading of the implement by parking stands, at opposite ends of the beam, which are either manually or automatically moved between support and stored positions. The wheels are each mounted to an arm having a latch hook secured thereto and which moves into latched engagement with a respective one of the bumper latch/bars to secure the implement to the trailer when the arms are raised by the implement lift cylinders to lower the header onto the frame stem. The implement has a swing tongue used to tow the trailer/implement combination endwise relative to the header. Mounted to one of the ramps is a storable trailer tongue which may be used to tow the trailer when it is empty.

20 Claims, 5 Drawing Sheets

TRAILER FOR ENDWISE TRANSPORT OF MOWER-CONDITIONER

BACKGROUND OF THE INVENTION

The present invention relates to trailers and more particularly to trailers for transporting implements.

It is not uncommon for implements to have a working width which is too great for fitting through gates in fences or for traveling down roads. To overcome the problem posed by these situations, trailers have been developed for the endwise transport of such implements.

U.S. Pat. No. 4,607,996 granted to Koch on Aug. 26, 1986 discloses an implement transport trailer developed for carrying an implement of the type including a draft tongue arched over the crop cutterhead of the implement and pivoted at its rear end to a location midway between opposite ends of the wheel-supported frame from which the cutterhead is suspended. The trailer includes a pair of retractable ramps oriented crosswise to the normal direction of travel of the trailer. Loading of the implement on the trailer is accomplished by lowering the ramps into ground contact and using the towing tractor to back the implement up the ramps and onto the trailer. The implement contacts a ramp lifting linkage which acts to automatically elevate the ramps to a transport position as the implement becomes properly positioned on the trailer for transport. The towing tractor and draft tongue of the implement are then positioned for towing the trailer, now supporting the cutterhead with its length disposed in the direction of travel.

While the linkage of the patented design provides for the automatic lifting of the ramps, this structure adds complexity and cost to the trailer.

SUMMARY OF THE INVENTION

The present invention relates to implement transport trailers and more specifically relates to trailers for the endwise transport of implements which remain attached to their towing tractors when being transported.

A broad object of the invention is to provide an improved implement transport trailer of the type described above which is of a relatively simple, reliable design.

A more specific object of the invention is to provide an implement transport trailer having ramps which are mounted so as to be pivotable between a lowered load position and a raised transport position as the implement moves over and beyond the pivot axis of the ramps.

Yet another object of the invention is to provide a trailer having a somewhat T-shaped main frame with the trailer support wheels being mounted at opposite ends of the stem of the T and with the retractable ramps being mounted at opposite ends of the top of the T.

Still another object of the invention is to provide an implement transport trailer having a stop bar engaged by the implement tires when the implement is properly positioned on the trailer, the implement having a pair of latch bars which become engaged with the stop bar, in response to lowering the header of the implement, so as to fix the implement in place on the trailer.

A further object of the invention is to provide an implement transport trailer having parking stands at its opposite ends which are automatically pivoted between a lowered park position and a raised transport position in response to movement of the ramps between their lowered load position and raised transport position.

Still another object of the invention is to provide and implement transport trailer having support wheels on opposite sides mounted for defining a horizontal transverse axis about which the trailer frame is pivotable and to have loading ramps so located relative to the axis that the pivot axis of the swing tongue is disposed nearly vertically above said transverse axis when the implement is loaded on the trailer for transport.

These and other objects of the invention will become apparent from a reading of the ensuing description together with the appended drawings.

DESCRIPTION OF THE PREFERRED EMBODIMENT

Preliminarily, it is to be noted that, unless otherwise stated, references such as right-hand or left-hand are determined in accordance with the perspective of an observer standing at the rear of a given machine and facing in the direction of forward travel of the machine. Also, certain structure may at times be described as existing in pairs when only one of the pair is shown, with it to be understood that the unshown structure is identical to or a mirror image of that shown.

Referring now to FIGS. 1–5, there is shown a towed implement 10, a tractor 12 (FIGS. 1 and 2, only) and an implement transport trailer 14. The implement 10 includes a wheel-supported main frame 16 comprising a horizontal transverse beam 18 having parallel right- and left-hand wheel-support legs 20 and 22, respectively, fixed to its opposite ends. Mounted in pivotal trailing relationship to the bottoms of the legs 20 and 22 are right- and left-hand wheel-support arms 24 and 26, respectively, only a pivot pin 28 coupling the arm 24 to the leg 20 being shown. Respectively mounted to rear ends of the arms 24 and 26 are a pair of ground support wheels 30 and 32. An elongate header or platform 34 is disposed parallel to and forwardly of the beam 18. The header 34 is suspended for floating vertically during cutting operation by a float linkage including right- and left-hand lower links 36 and 38 having their respective rear ends pivotally coupled, as at 42 (only one shown), to the wheel support arms 28 and 30 and having their respective front ends pivotally coupled, as at 44, to a lower, rear location of a frame member of the header. A center link 46, as viewed from the side, is disposed in substantial parallel relationship to the links 36 and 38 and has its forward end pivotally attached, as at 48, to a frame member of the header 34 and its rear end pivotally attached, as at 50, to the frame beam 18. A pair of hydraulic cylinders 52 and 54, respectively, have respective rod ends pivotally connected to the wheel-support arms 24 and 26, only a pivot pin 56 connecting the cylinder 52 to the arm 24 being shown, and have respective head ends pivotally connected, as by pins 58 and 60, to a bracket forming part of the implement frame 16. Thus, it will be appreciated that extension of the cylinders 52 and 54 will result in the arms 24 and 26 being pivoted downwardly-so as to effect raising of the header 34 to its transport position, shown in FIGS. 1–3, while shortening of the cylinders 52 and 54 will result in the arms 24 and 26 being pivoted upwardly so as to effect lowering of the header 34 to its working position, shown in FIG. 4. Having a purpose to be explained below, are a pair of latch arms 62 and 64, respectively, having respective forward ends mounted to the tops of the wheel support arms 24 and 26, the latch arms 62 and 64 projecting rearwardly from the arms 24 and 26 and terminating in upwardly extending latch hooks 66 and 68, respectively. A draft tongue 70 has its rear end pivotally mounted, as at 72, to a pedestal 74 fixed to a middle location along the frame beam 18, and has a forward end hitched, as at 76, to the lower draft arms 78 of the tractor 12. A tongue swing cylinder 80 has its head end pivotally coupled to the tongue 70 by a pin 82 and has its rod end pivotally coupled to the frame beam 18, at a location adjacent the right-hand end of the beam, by a pin 84.

The following description will be made with reference to FIG. 6, where, for sake of aiding in the description, the right-hand end of the trailer 14 will be considered the forward end of the trailer. The trailer 14 includes a main frame 86 comprising a first tubular beam 88, extending longitudinally in the direction of travel at one side of the trailer, and a second tubular beam 90, extending transversely to the direction of travel and having one end fixed, as by gussets 92, to a mid-location between opposite ends of the first beam 88. The frame structure thus formed by the beams 88 and 90 is T-shaped with the beam 88 forming the top of the "T" and with the beam 90 forming the stem of the "T". A brace 94 extends between and has its opposite ends respectively fixed to the beams 88 and 90. An implement header abutment member 96 is fixed to a top surface of the beam 90 at a location spaced from but adjacent the left-hand end of the beam, the member 96 defining an arched support or rest surface 98. A right-hand axle support bracket 100 (FIG. 8, only) is fixed partly to the bottom of the beam 88 and partly to the bottom of the beam 90 so as to bridge the junction between the two beams. The bracket 100 includes a pair of spaced, parallel plates 102 and 104, and received between and pivotally mounted to the plates 102 and 104, as by a pivot pin 106 (FIG. 5, only), is a right-hand walking-beam or rocker arm 108. Front and rear spindles, of which only the front spindle 110 is shown (FIG. 8, only), are respectively mounted to, and project rightwardly from, front and rear ends of the walking-beam 108, and front and rear wheels 112 and 114 are respectively mounted to the spindles. Similarly, a left-hand axle support bracket 116 is fixed to the bottom of the left-hand end of the second beam 90. The support bracket 116 includes a pair of spaced parallel plates 118 and 120, respectively, and extending between and being pivotally mounted to these plates, as by a pivot pin 122, is a left-hand walking-beam or rocker arm 124. Front and rear spindles 126 and 128, respectively, are mounted to and project leftwardly from front and rear ends of the walking-beam 124, and front and rear wheels 130 and 132 are mounted to the spindles. Thus, the pivot pins 106 and 122 define a horizontal transverse pivot axis about which the trailer frame 86 may pivot. While the use of the walking-beams 108 and 124 together with tandem mounted wheels is desired, many of the advantages of the present invention will be realized in a trailer structure using single wheels mounted directly to the main frame 86 at the respective locations of the pivot pins 106 and 122.

Fixed to and projecting upwardly from front and rear end portions of longitudinal first beam 88 of the frame 86 are front and rear bumpers or stops 134 and 136, respectively. Each of the bumpers 134 and 136 includes a tubular member formed into a u-shape and defining fore-and-aft spaced vertical legs 138 having upper ends joined by a bight portion defining a bumper/latch bar 140. Welded to a lower portion of each of the legs 138 is a formed gusset 142 that is,in turn,welded to top and outer surfaces of the beam 88.

Figure 7:
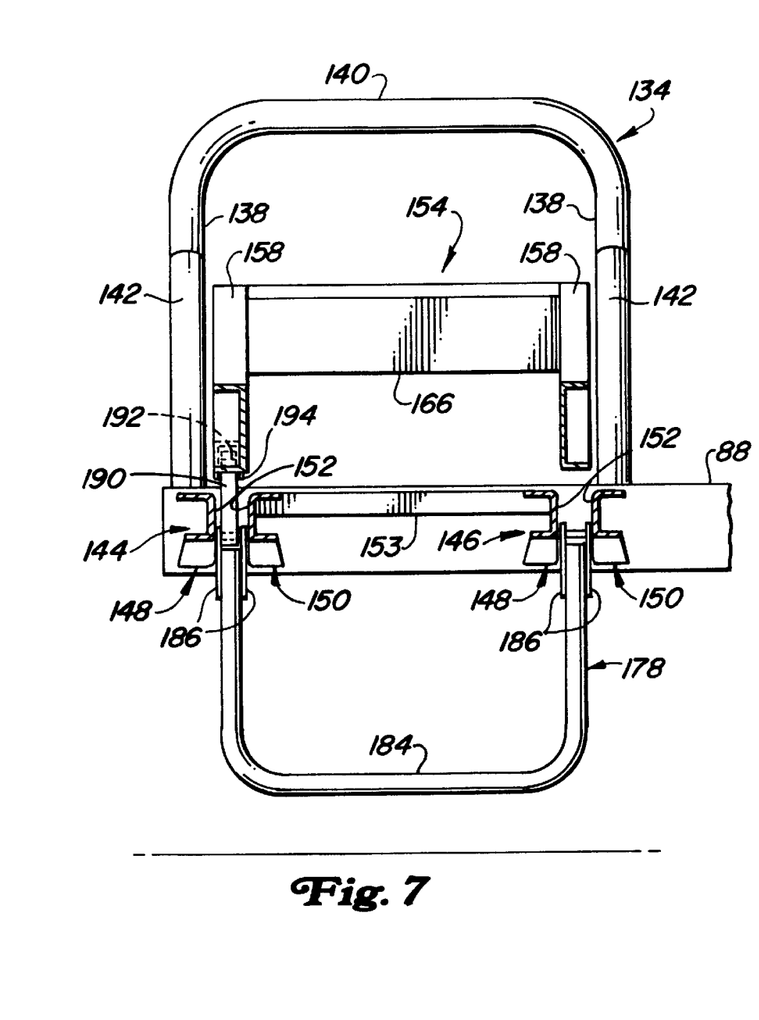
FIG. 7 is a vertical sectional view taken along line 7—7 of FIG. 8.
Figure 8:
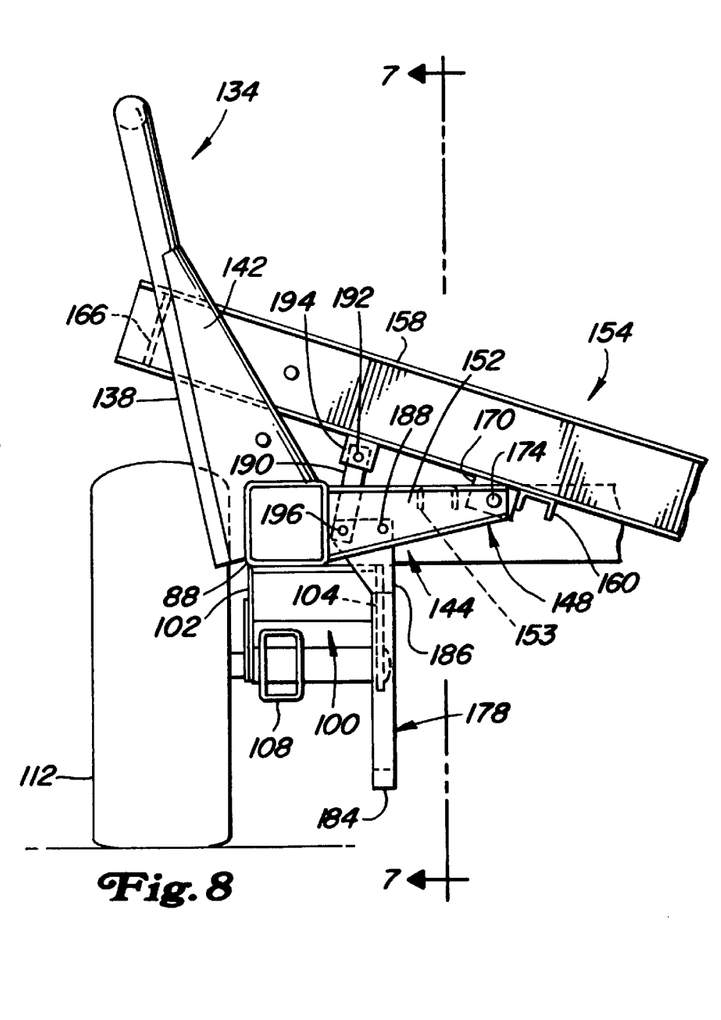
FIG. 8 is a front elevational view of a portion of the transport trailer showing the linkage for automatically lowering and raising the parking stand respectively in response to lowering and raising the loading ramp.

Referring now also to FIGS. 7 and 8, it can be see that adjacent each of the front and rear bumpers 134 and 136 are front and rear support brackets 144 and 146, respectively, with each bracket including front and rear, channel members 148 and 150, respectively. The channel members 148 and 150 are disposed with parallel webs 152 spaced from and facing each other, and are welded to and project leftwardly at a right-angle from an inner or left-hand surface of the longitudinal beam 88. A channel-like slat 153 extends between and is welded to the webs 152 respectively of the rear channel member 150 of each front support brackets 144 and of the front channel member 148 of each rear support bracket 146. The front and rear support brackets 144 and 146 that are adjacent the front bumper 134 are spaced apart a distance just slightly less than the distance between the bumper legs 138, while the front and rear support brackets 144 and 146 that are adjacent the rear bumper 136 are spaced apart a distance just slightly less than the distance between the legs 138 of the rear bumper 136.

The transport trailer 14 further includes identical front and rear, transversely extending loading ramps 154 and 156, respectively. Each ramp 154 and 156 includes a pair of parallel, fore-and-aft side rails 158 formed from oppositely opening channel members that are spaced apart by a distance substantially equal to the distance between the support brackets 144 and 146. The rails 158 are joined together by a plurality of identical slats 160, in the form of downwardly opening channel members, extending crosswise to and being welded to a lower flange of the rails 158 at equally spaced locations, with a rightmost one of the slats 160 being located adjacent the left-hand end of the brackets 144 and 146. Similarly welded to the lower flange of the rails 158 at a location about half-way between opposite ends of each of the ramps 154 and 156 is a tubular member 162 of square cross-section. A draft tongue 164 is telescopically received in that one of the tubular members 162 which forms part of the front loading ramp 154 and is moveable from a stored position, as shown in FIG. 6, wherein it is retracted within the tubular member 162, and an extended towing position for use in cases when it is desired to move the trailer without an implement 10 being loaded thereon. Of course the tongue 164 may be installed in the tubular member 162 of the rear loading ramp 156 if it is desired to tow the empty trailer 14 in the opposite direction. The right-hand end of each of the ramps 154 and 156 is closed by a blocking member 166 extending between and welded to the webs of the side rails 158 while a ground engaging spike or anchor member 168 is secured to and projects downwardly from a left-hand end of each of the rails 158 of each of the ramps 154 and 156.

Figure 1:
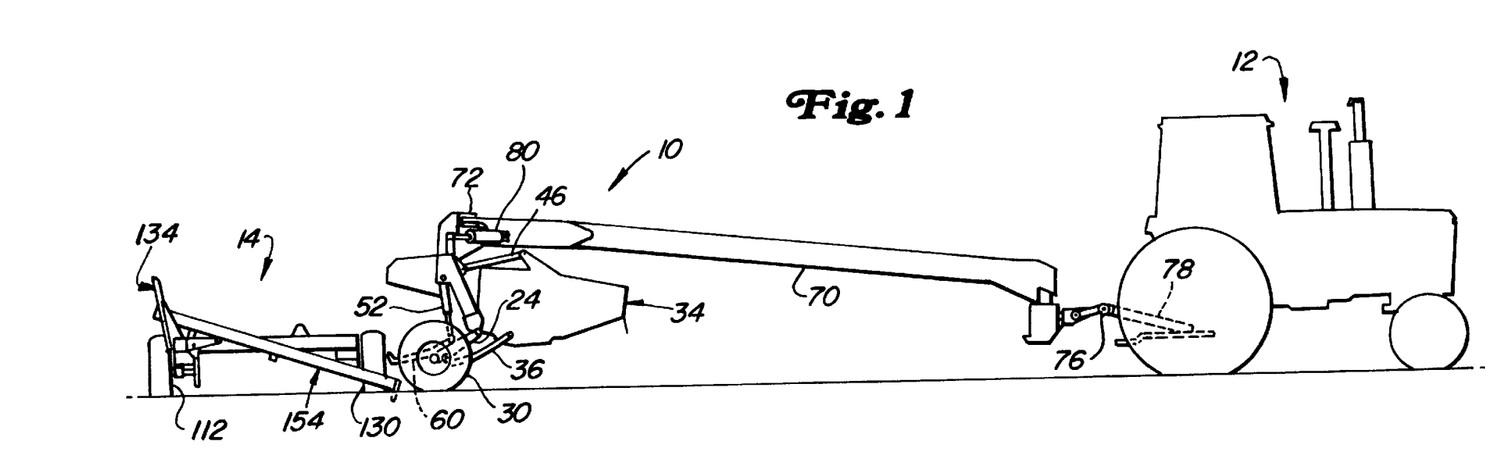
FIG. 1 is a somewhat schematic right side elevational view showing a tractor and towed implement positioned for being loaded onto an implement transport trailer constructed in accordance with the principles of the present invention.
Figure 2:
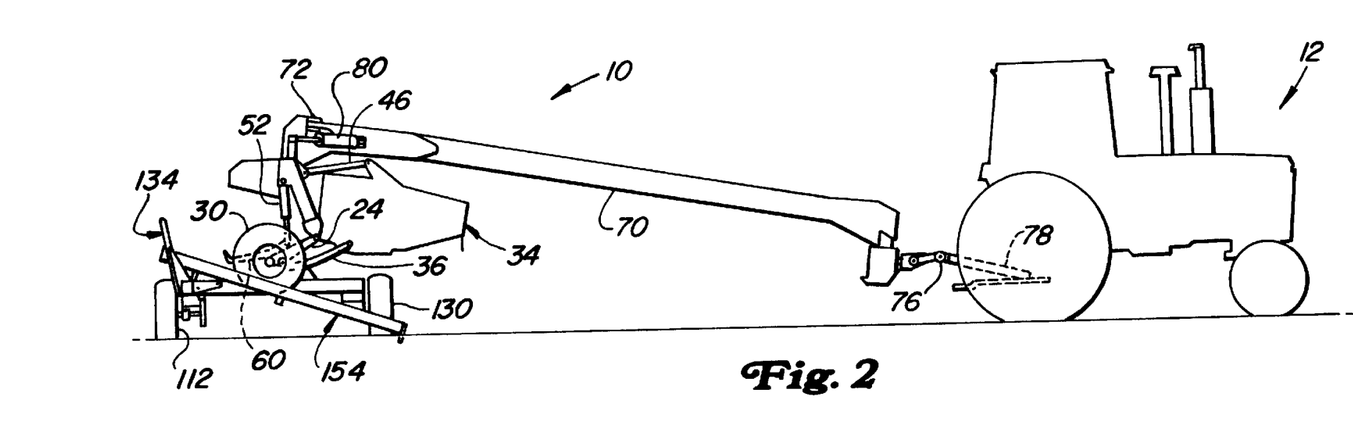
FIG. 2 is a view like FIG. 1 but showing the implement backed half-way up the loading ramps of the transport trailer.
Figure 3:
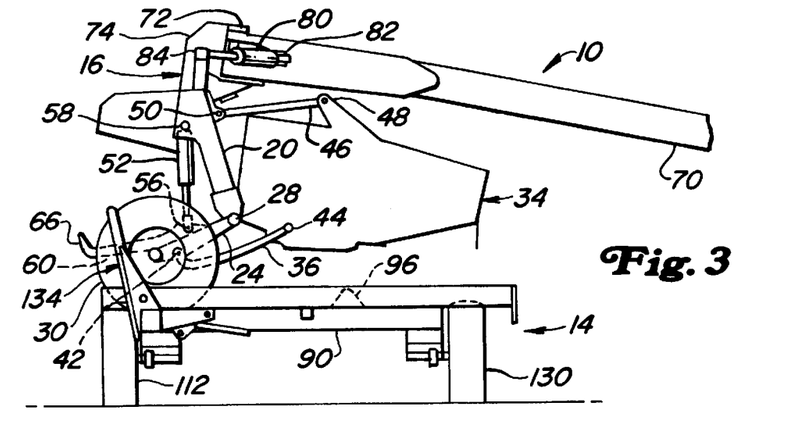
FIG. 3 is a right side elevational view showing the implement in a loaded position on the transport trailer.
Figure 6:
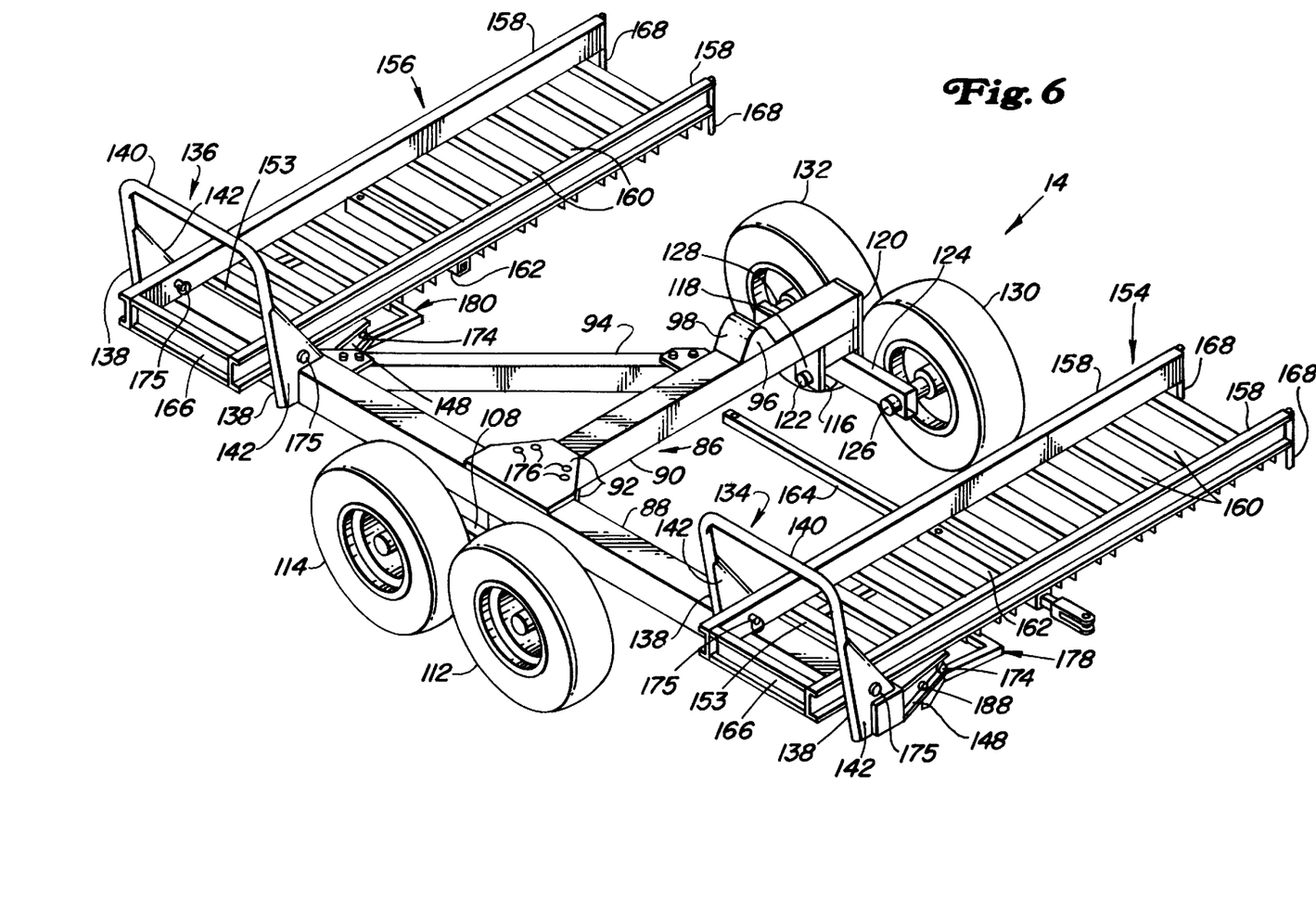
FIG. 6 is a right front perspective view of the transport trailer.

A right-hand end portion of the front ramp 154 is received between the legs 138 of the front bumper 134, between the front and rear channel members 144 and 146 of the front support structure and, when raised, as shown in FIG. 6, extends over and rightwardly beyond the frame longitudinal beam 88. The ramp 154 may rest on or be spaced slightly above the beam 88. Similarly, a right-hand end portion of the rear ramp 156 is received between the legs 138 of the rear bumper 136, between the front and rear channel members 144 and 146 (not visible) of the rear support structure and is supported by the beam 88, with the extreme right-hand end of the ramp 156 being spaced rightwardly of the beam 88. Mounting tabs 170 are fixed to and project downwardly from the bottom flange of each of the rails 158 of the front and rear ramps 154 and 156 at respective locations adjacent the right-most slats 160 of the ramps. The mounting tabs 170 extend between the webs 152 of, and near the left-hand ends of, the front and rear channel members 148 and 150 of each of the front and rear brackets 144 and 146. Inserted through axially aligned holes provided in adjacent ones of the mounting tabs 170 and webs 152 are pivot pins 174 which define a horizontal, fore-and-aft axis about which the ramps 154 and 156 may each be pivoted between a raised, horizontal transport position, as shown in FIG. 6, and a lowered loading position with the spikes 168 embedded in the ground, as shown in FIGS. 1 and 2. Provided for latching each of the ramps 154 and 156 in its raised transport position, as shown in FIG. 6, is a pair of latch pins 175 which are releasably received in aligned holes provided in the bumper gussets 142 and adjacent rails 158 of the ramps. Storage holes 176 for holding the pins 175 when the ramps 154 and 156 are in their loading positions are provided in the main frame gussets 92.

Respectively associated with the front and rear ramps 154 and 156 are identical front and rear parking stands 178 and 180, with only the front stand 178 being shown and described in detail. As can best be seen in FIGS. 7 and 8, the parking stand 178 includes a tubular, u-shaped stand member 184 having respective ends of each of its legs sandwiched between and welded to a pair of substantially right-triangular plates 186 which extend a short distance beyond the legs. The right-triangular plates 186 of one leg extends between the webs 152 of the channel members 148 and 150 of the front mounting bracket 144 while the right-triangular plates 186 of the other leg extend between the webs 152 of the channel members of the rear mounting bracket 146. Serving to pivotally mount the stand member 178 to the brackets 144 and 146 are a pair of pivot pins 188 that are respectively in received aligned holes provided in the right-angle corners of the right-triangular plates 186 and in the webs 152 of the bracket channel members 148 and 150. So that the stand 178 is raised and lowered automatically in response to raising and lowering the ramp 154, a motion transfer link 190 has one end pivotally connected, as by a pivot pin 192, to parallel legs of a tab 194 welded to the bottom of the front rail 158 of the ramp 154 while the other end of the link 190 is pivotally attached, as by a pivot pin 196, to another corner of the front right-triangular plate 186. When the ramp 154 is in its lowered loading position, as shown in FIG. 8, the stand member 184 will be disposed substantially vertically with its lower end being in close proximity to the ground. The link 190 will then extend downwardly and slightly toward the beam 88 from the tab 194. As the ramp 154 is raised, the link 190 will act to cause the stand member 184 to be rotated counterclockwise about the pivot pins 180 to a generally horizontal transport position, shown in FIG. 6.

Instead of the automatically-operated parking stands 178 and 180, the trailer 14 may be equipped with manually-operated parking stands. While any type of manually-operated parking stand may be used, reference may be made to FIGS. 9 and 10, respectively where two somewhat similar first and second manually-operated parking stands 198 and 200, respectively, are shown mounted to a forward end portion of an elongate beam 88' of the trailer main frame 86 which differs from the previously described beam 88 only in being slightly longer so that it extends forwardly beyond the front bumper 134 and rearwardly beyond the rear bumper 136. Only the parking stand 198 or 200 mounted to the forward end of the beam 88' is shown, it to be understood that a similar stand is mounted to the rear end of the beam 88'.

Figure 9:
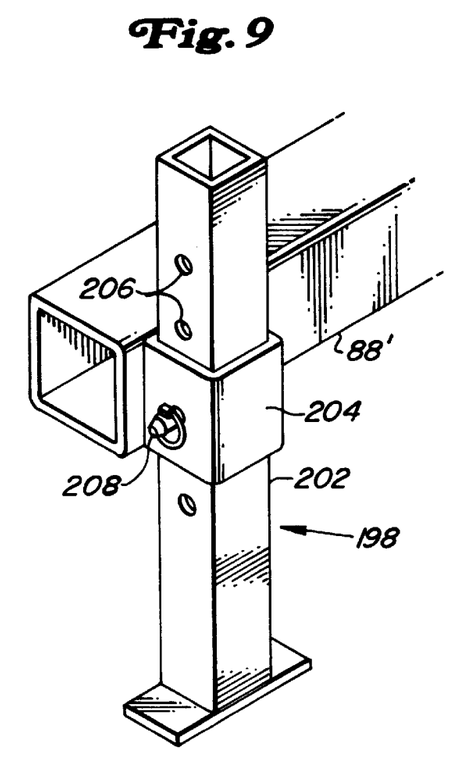
FIGS. 9 and 10 respectively show different manually-operated parking stands which may be used in lieu of the automatically-operated parking stand.

The parking stand 198 includes an elongate, tubular stand member 202 of square cross section which is telescopically received in a complementary shaped tubular holder 204 welded to a left-hand surface of the beam 88'. The stand member 202 is provided with a series of vertically spaced mounting holes 206 and a pin 208 is received through one of the holes 206 and an aligned hole in the holder 204 for holding the stand member 202 in a desired vertical position. The stand member 202 and the corresponding stand member at the rear end of the beam 88' will be raised relative to the beam 88' for transport and are lowered relative to the beam 88' for controlling or eliminating rocking movement of the trailer frame 86 about the pivot axis defined by the pivotal connections of the rocker arms 108 and 124 with the frame when an implement is being loaded on the trailer.

Figure 10:
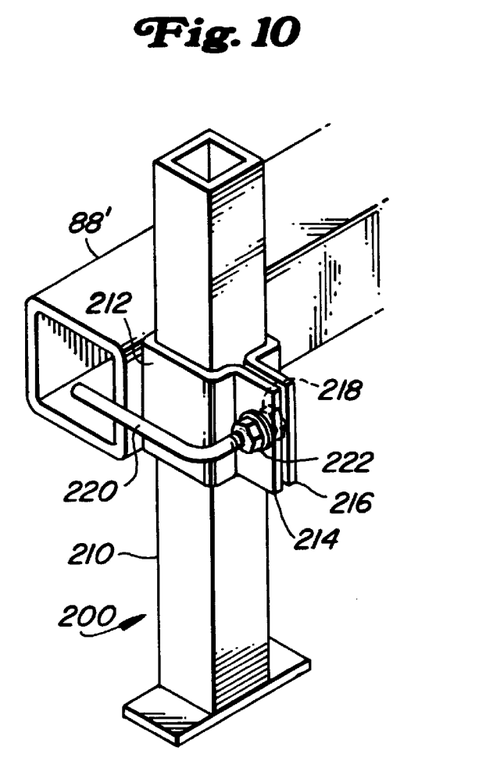

The parking stand 200 is provided with an elongate tubular stand member 210 of square cross section telescopically received in a complementary shaped tubular, split clamp 212 welded to a left-hand surface of the beam 88'. The clamp 212 is defined by a formed strap having opposite ends defined by a pair of spaced apart, parallel flanges 214 and 216 bent at 90° relative to an adjacent portion of the strap and having aligned apertures therein. A first nut 218 is welded to the flange 216 in alignment with its aperture. An L-shaped clamp control handle 220 has a threaded end extending through the apertures and threaded into the first nut 218. A flanged clamping nut 222 is carried by the threaded end of the handle 220 and has its flange engaged with the clamp flange 214 so that by screwing the handle into the nut 218 the nut 222 acts to draw the holder 212 into tight engagement with the stand member 210. Of course, loosening of the holder 212 to permit vertical movement of the stand member 210 is accomplished by turning the handle 220 so as to withdraw it from the nut 218. It is to be noted that the parking stand 200 has an advantage over the parking stand 198 in that, when the stand member 202 or 210 is supporting a significant portion of the weight of the loaded implement, it is easier to loosen the clamp 212 to permit raising of the stand member 210 than it is to withdraw the pin 208 from the aligned holes of the stand member 202 and holder 204 of the parking stand 198. The operation of the clamp 200, except for the way the stand member 202 is freed for movement, is exactly the same as that described above relative to clamp 198.

The operation of the trailer 14 is thought to be understood from the foregoing description but will be briefly reiterated here. Loading of the implement 10 for transport on the trailer 14 is accomplished by first positioning the trailer 14 at a desired loading site and then readying it for receiving the implement 10 by removing the ramp latch pins 175 of first one, then the other, of the ramps 154 and 156 and lowering the ramps to rest their spikes 168 on the ground. Lowering of the ramps 154 and 156 will automatically result in the parking stands 178 and 180 being lowered to their park positions wherein the bottoms of the stands are close to or in engagement with the ground, as shown in FIGS. 7 and 8.

Figure 4:
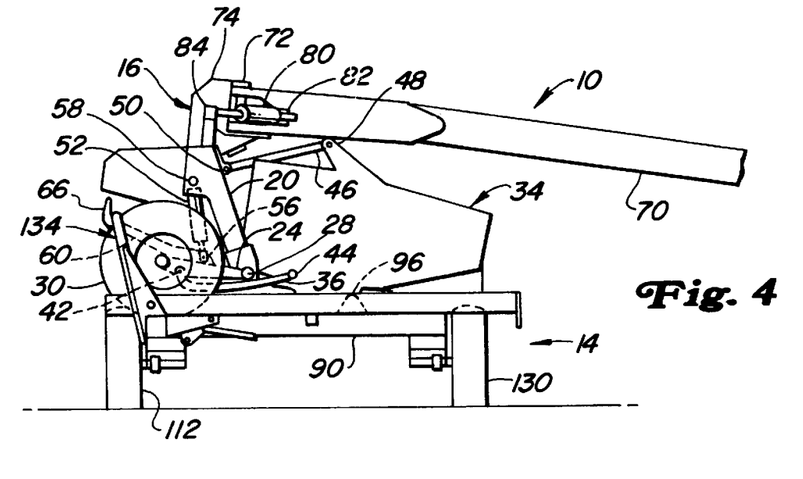
FIG. 4 is a right side elevational view like FIG. 3 but showing the implement header lowered and latch hooks in engagement with the stop bars of the transport trailer.
Figure 5:
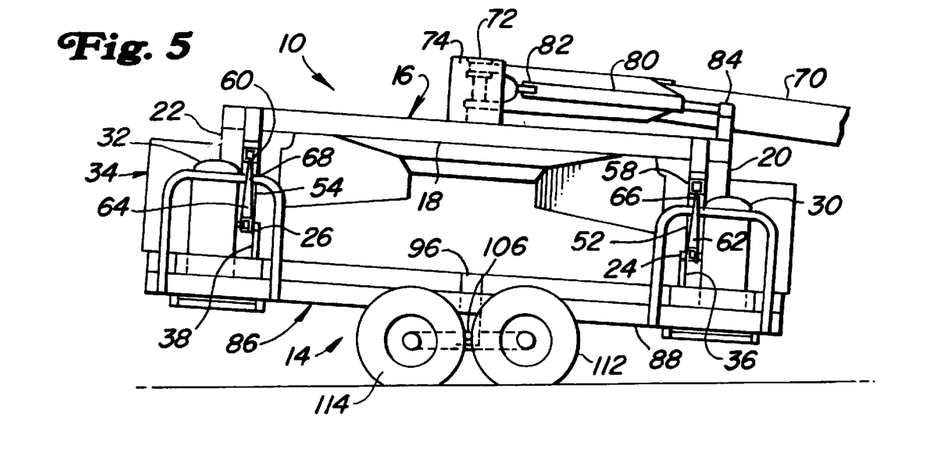
FIG. 5 is a right side elevational view like FIG. 4 but showing the transport trailer and implement tongue positioned relative to each other for endwise transport of the implement on the trailer.

Before being loaded on the trailer, the header 34 of the implement 10 will be raised to its transport position by extending the lift cylinders 52 and 54. The tractor 12 is then used to back up the implement 10 with the wheels 30 and 32, respectively, traveling up the ramps 154 and 156, according to the sequence depicted in FIGS. 1–3. As the wheels 30 and 32 first engage the ramps 154 and 156, the spikes 168 will dig into the ground to aid in preventing the trailer 10 from skidding sideways. Then, as the wheels 30 and 32 travel up the ramps 154 and 156, they will eventually pass over the pivot axis of the ramps 154 and 156 defined by the pivot pins 174 with the weight of the implement 10 acting to elevate the ramps 154 and 156, and, hence, the parking stands 178 and 180, to their transport positions, shown in FIG. 6, the wheels eventually engaging the bumper/latch bars 140 of the bumpers 134 and 136 at which position they are located directly on the trailer main frame beam 88, as no ramp slat 160 is present in this area and they will have passed beyond the bracket slats 153. During backing the implement 10 onto the trailer 14, the parking stands 178 and 180 act to stablilize any tendency the trailer might have to pivot about the axis defined by the pivot connections 106 and 122 of the wheel rocker arms 108 and 124. Once the wheels 30 and 32 are positioned against the bumpers 134 and 136, the implement lift cylinders 52 and 54 are retracted to lower the header 34 until it rests upon the abutment member 96. This retraction of the lift cylinders 52 and 54 results in the wheel support arms 24 and 26 rotating clockwise so as to bring the latch hooks 66 and 68 of the latch arms 62 and 64, respectively, into engagement with the bumper/latch bars 140 so as to secure the implement 10 to the trailer 14, as shown in FIGS. 4 and 5.

It should be noticed that the axis of the pivot connection 72 of the tongue 70 is now located approximately vertically above the trailer frame pivot axis defined by the walking-beam pivot pins 106 and 122. This fact is important since the height of the pulling point of the tongue 70 results in a moment arm which transfers considerable pulling force to the trailer frame 86 with the effects of this force being minimized by the pivot connection being above the pivot axis defined by the walking-beam pivot pins 106 and 122.

In any event, once the implement 10 is loaded on the trailer 14, the implement tongue swing cylinder 80 is actuated to cause the implement frame 16, together with the trailer 14, to pivot about the axis of connection 72, relative to the implement tongue 70, until the trailer is in substantial alignment with the implement tongue 70. The sets of wheels 112, 114 and 130, 132 will skid during this operation. It has been found helpful in some situations to slowly drive the tractor 12 to aid in moving the tongue 70 through the last portion its movement towards its transport position. The implement 10 can then be transported with the length of its header 34 being in alignment with the direction of transport.

Operation of the trailer 14 when equipped with either of the manually-operated parking stands 198 or 200, respectively shown in FIGS. 9 and 10, instead of the automatically-operated 178 and 180, is basically the same as that with the automatically-operated parking stands except that readying the trailer 14 for receiving the implement requires the operator to lower the stand members 202 or 210 to parking positions and readying the implement for transport after loading the implement requires the operator to raise the stand members 200 or 204 to their transport positions.

In the event that it is desired to move the trailer 14 without using the implement 10, this may be done by removing the pins holding the tongue 164 in its retracted condition in the tube 162, extending the tongue to its work position and then re-inserting the pins to hold it in place. The trailer 14 can then be towed by any vehicle having a drawbar that can be connected to the clevis of the tongue 164. The trailer 14 can be towed in the opposite direction by installing the tongue in the tube 162 provided on the ramp 156.

We claim:

1. A trailer for transporting a two-wheeled implement, comprising: a main frame having opposite first and second sides; first and second ground-engaging wheel means respectively supporting said opposite first and second sides of said frame for movement in a direction of travel; said frame including a horizontal, elongate first frame member extending in said direction of travel and defining said first side of the trailer frame; first and second parallel ramps extending transversely to said first frame member and being spaced apart for receiving wheels of an implement to be transported; first and second attachment means respectively coupling said first and second ramps to said main frame for pivoting about a horizontal axis extending in said direction of travel and being spaced toward said second side of said main frame from said first frame member; and said ramps each having a first end portion extending above said first frame member and a second end portion located adjacent said second side of said main frame; said ramps each being pivotable about said axis between a lowered loading position, wherein said first end portion is elevated above said first frame member and said second end portion is in ground engagement, and a raised transport position wherein said first end portion extends approximately horizontally above and at least in close proximity to said first frame member and said second end portion is elevated from ground engagement, whereby said ramps are adapted for being moved from their loading position to their transport position by the weight of an implement being loaded as the wheels of the implement move past said axis as they travel from the second end portions to the first end portions of said ramps.

2. The trailer defined in claim 1 and further including first and second parking stands including retractable stand members respectively mounted to said main frame at locations adjacent said first and second ramps.

3. The trailer defined in claim 2 wherein said retractable stand members are each vertically pivotally mounted for movement between a parking position, wherein they project downwardly from said main frame to a position at least closely adjacent a ground surface location, and a transport position elevated above said ground surface location; and motion transfer link means connected between each ramp and an adjacent one of said retractable stand members for automatically moving said stand members between their transport and parking positions in response to the ramps being moved between their transport and load positions, and vice-versa.

4. The trailer defined in claim 2 wherein mounting means are provided for mounting said retractable stand members for telescopic movement between said transport and parking positions.

5. The trailer defined in claim 1 and further including first and second rigid bumper means, respectively, mounted to said first frame member at respective locations in alignment with said first and second ramps and adapted for being engaged by wheels of an implement being loaded when the implement is properly positioned on said trailer for transport.

6. The trailer defined in claim 1 wherein said main frame includes a horizontal elongate second frame member extending crosswise to and having a first end fixed to said first frame member, at a location approximately midway between opposite ends of said first frame member, and a second end located adjacent said second side of said trailer; and said first and second ground-engaging wheel means being mounted to said main frame at locations adjacent said first and second ends of said second frame member.

7. The trailer defined in claim 1 wherein a draft tongue assembly is mounted to at least one of said ramps and includes a draft tongue extending in said direction of travel.

8. A combination of an implement transport trailer and implement, comprising: said trailer including a trailer main frame; ground engaging wheel means supporting the trailer main frame for travelling in a direction of travel; first and second ramps spaced from each other in said direction of travel, disposed crosswise to said direction of travel and being mounted to said trailer main frame for movement between respective loading positions, wherein the ramps extend upwardly from respective locations on the ground to respective locations above said trailer main frame, to respective transport positions, wherein the ramps are elevated above the ground; a pair of bumpers being fixed to the trailer main frame respectively in alignment with said first and second ramps and adjacent to said locations above said trailer main frame; said bumpers each including horizontal bumper/latch bars extending in said direction of travel; said implement including an implement main frame supported on a pair of ground-engaging wheels for travel in a working direction; a header suspended from said implement main frame and being elongated in a direction crosswise to said working direction; wheel support arms being vertically pivotally mounted to said implement main frame and respectively carrying said pair of ground-engaging wheels; a pair of header suspension links extending between said wheel support arms and said header; a pair of hydraulic lift cylinders coupled between said implement main frame and said pair of wheel support arms and being extensible for moving the wheels downwardly relative to the implement main frame for raising the implement main frame and header relative to the ground, and being retractable for moving the wheels upwardly relative to the implement main frame for lowering the implement main frame and header relative to the ground; a pair of latch members being respectively mounted for movement with said pair of wheel support arms and each latch member including an upwardly opening latch hook; and said bumper/latch bars of said trailer and said latch members and ground-engaging wheels of said implement being so located one to another that said implement wheels will be engaged with said bumper/latch bars when the implement is properly positioned on said trailer for transport and said latch hooks will be brought into engagement with said bumper/latch bars by retracting said pair of lift cylinders once said implement wheels become engaged with said bumper/latch bars.

9. The combination defined in claim 8 wherein each bumper is of an inverted u-shape defined by its bumper/latch bar and a pair of upright legs respectively joined to opposite ends of the bumper/latch bar and having lower ends fixed to said implement main frame.

10. The combination defined in claim 8 wherein said trailer main frame further includes an abutment located for supporting a central portion of said header when the implement is positioned on said trailer for transport and the lift cylinders are retracted to lower the header onto said abutment.

11. A combination of an implement transport trailer and implement, comprising: said trailer including a trailer main frame; ground engaging wheel means supporting the trailer main frame for travelling in a direction of travel and for pivoting about a horizontal axis extending transversely to said direction of travel; first and second ramps spaced from each other in said direction of travel, disposed crosswise to said direction of travel and being mounted to said trailer main frame for movement between respective loading positions, wherein the ramps extend upwardly from respective locations on the ground to respective locations above respective transport locations of said trailer main frame, and respective transport positions, wherein the ramps are elevated above the ground; means mounting said ramps to said trailer main frame for moving from said loading positions to said transport positions in response to implement weight moving up said ramps and toward said respective transport locations of said trailer main frame with the ramps depositing said implement at said respective transport locations of said trailer main frame when the ramps reach their respective transport positions; said implement including an implement main frame supported on a pair of ground-engaging wheels for travel in a working direction, with said pair of ground-engaging wheels being spaced from each other a distance equal to the spacing between center points of said ramps; a header suspended from said implement main frame and being elongated in a direction crosswise to said working direction; a swing tongue extending over said header and being pivotally mounted to said implement main frame for swinging horizontally about an upright pivot axis; and said ramps being so located relative to said horizontal transverse pivot axis of said trailer that said upright pivot axis of said implement is, when said implement wheels are positioned at said respective locations of said trailer main frame, in substantial vertical alignment with said horizontal transverse pivot axis of said trailer main frame.

12. An implement transport trailer, comprising: a T-shaped main frame wherein a top of the trailer first "T" and extends in a direction of travel of the trailer; first and second ramps extending crosswise to said direction of travel in parallel coextensive relationship to said stem of the "T"; and first and second mounting means respectively mounting said first and second ramps to opposite ends of said top of the "T" of said T-shaped main frame for movement between respective lowered loading positions wherein a first end of the ramp rests on the ground and a second end is disposed above said top of the "T" of said T-shaped main frame, and respective raised transport positions wherein said first and second ramps are completely elevated above the ground.

13. The implement transport trailer defined in claim 12 wherein said first and second mounting means define a pivot axis about which said first and second ramps are swingable between their respective loading and transport positions; and said pivot axis being located between opposite ends of each of said first and second ramps, whereby an implement rolling up the ramps from their first to their second ends will move over said axis and cause said ramps to be elevated to their respective transport positions.

14. The implement transport trailer defined in claim 13 and further including first and second parking stands having retractable stand members mounted to said top of the "T" of said T-shaped main frame at respective locations adjacent said first and second ramps; and said parking stands each including mounting means connecting its stand member to said main frame for movement between a parking position wherein the stand member is located at least in close proximity to the ground, and a transport position wherein the stand member is elevated a considerable distance above the ground.

15. The implement transport trailer defined in claim 14 wherein said mounting means pivotally connects said stand member to said main frame with said stand member being substantially vertical when in its parking position and being substantially horizontal when in its transport position.

16. The implement transport trailer defined in claim 15 and further including a motion transfer means connected between the stand member and the adjacent ramp for moving the stand member between its parking and transport positions in response to the ramp moving from its loading to its transport position.

17. The implement transport trailer defined in claim 15 wherein each of said stand members is u-shaped with the mounting means establishing the pivotal connection being defined by a pair of axially aligned pivot pins respectively extending through end portions of opposite legs of each stand member.

18. The implement transport trailer defined in claim 12 and further including a pair of bumper members respectively fixed to said top of the "T" of said T-shaped main frame at locations aligned with said first and second ramps, said pair of bumper members being located for being contacted by opposite wheels of an implement as the wheels reach a location directly above said top of the "T" of said T-shaped main frame.

19. The implement transport trailer defined in claim 18 wherein said bumper members are each inverted u-shaped with opposite legs of each bumper member being fixed to the top of the "T" of said T-shaped main frame and with the opposite legs of each bumper member being joined by a bumper bar located for being contacted by one of said opposite wheels of said implement.

20. The implement transport trailer defined in claim 12 wherein said stem of said T-shaped main frame includes an upwardly projecting abutment located for supporting a lowered header of an implement loaded on said trailer.

* * * * *

UNITED STATES PATENT AND TRADEMARK OFFICE
CERTIFICATE OF CORRECTION

PATENT NO.   : 5,975,829
DATED        : November 2, 1999
INVENTOR(S)  : James C. Walters et al.

It is certified that error appears in the above-indentified patent and that said Letters Patent is hereby corrected as shown below:

Column 10, line 42 delete "trailer first" and insert -- "T" is longer than a stem of the --.

Signed and Sealed this

Third Day of April, 2001

Attest:

NICHOLAS P. GODICI

*Attesting Officer*     Acting Director of the United States Patent and Trademark Office